US008137776B2

(12) United States Patent
Morris et al.

(10) Patent No.: US 8,137,776 B2
(45) Date of Patent: Mar. 20, 2012

(54) LAMINATION ADHESION OF FOIL TO THERMOPLASTIC POLYMERS

(75) Inventors: Barry Alan Morris, Wilmington, DE (US); Yves M. Trouilhet, Vesenaz (CH)

(73) Assignee: E.I. du Pont de Nemours and Company, Wilmington, DE (US)

( * ) Notice: Subject to any disclaimer, the term of this patent is extended or adjusted under 35 U.S.C. 154(b) by 1687 days.

(21) Appl. No.: 10/967,519

(22) Filed: Oct. 18, 2004

(65) Prior Publication Data
US 2005/0106344 A1 May 19, 2005

Related U.S. Application Data

(60) Provisional application No. 60/512,545, filed on Oct. 17, 2003.

(51) Int. Cl.
*B32B 1/02* (2006.01)
*B32B 15/082* (2006.01)
*B29C 47/06* (2006.01)
*B29C 47/04* (2006.01)

(52) U.S. Cl. ...... 428/35.7; 428/35.2; 428/461; 264/515; 264/514

(58) Field of Classification Search .................. 428/35.2, 428/36.4, 35, 457, 458, 461, 35.7; 264/514, 264/515
See application file for complete search history.

(56) References Cited

U.S. PATENT DOCUMENTS

| 2,953,551 | A | * | 9/1960 | White ................................. 526/64 |
| 3,924,051 | A | | 12/1975 | Wiggins et al. |
| 4,146,521 | A | * | 3/1979 | Godfrey ........................... 524/499 |
| 4,663,362 | A | * | 5/1987 | Koebisu et al. ................ 521/134 |
| 5,057,372 | A | | 10/1991 | Imfeld et al. |
| 5,165,988 | A | * | 11/1992 | Schaefer ........................ 428/220 |
| 5,227,245 | A | | 7/1993 | Brands et al. |
| 5,373,041 | A | * | 12/1994 | Prejean ........................... 524/143 |
| 5,376,740 | A | | 12/1994 | Pfleger et al. |
| 5,543,233 | A | * | 8/1996 | Latiolais et al. ............... 428/516 |
| 5,582,923 | A | | 12/1996 | Kale et al. |
| 5,773,155 | A | | 6/1998 | Kale et al. |
| 5,993,977 | A | * | 11/1999 | Laiho et al. ..................... 428/514 |
| 2003/0012900 | A1 | * | 1/2003 | Wolf et al. ..................... 428/35.2 |
| 2003/0096110 | A1 | * | 5/2003 | Terada et al. ................. 428/345 |
| 2003/0134123 | A1 | * | 7/2003 | Paine ......................... 428/411.1 |
| 2004/0048006 | A1 | * | 3/2004 | Venkatasanthanam et al. ............................ 428/32.1 |
| 2006/0228480 | A1 | * | 10/2006 | Lin ............................... 427/275 |

FOREIGN PATENT DOCUMENTS

| EP | 1 203 655 A1 | | 5/2002 |
| JP | 58188619 A | | 11/1983 |
| WO | WO 98/21286 | | 5/1998 |
| WO | WO-0030852 | * | 6/2000 |
| WO | WO0030852 | * | 6/2000 |
| WO | WO 02/060993 A1 | | 8/2002 |
| WO | WO 2004/089565 A1 | | 10/2004 |

OTHER PUBLICATIONS

Bernard Henn, It's Time to Get to Know n-Butyl Acrylate Copolymers, Plastics Technology, pp. 71-74 (Jun. 1992).
Donna S. Davis et al, High Frequency Sealing of Polyolefin Structures, J. Plastic Film & Sheeting, vol. 11, 113-125, (Apr. 1995).
Donna S. Davis, ENBA: Expanding the Portfolio, Antec '95 pp. 2115-2119.
Erkki Laiho et al, Specialties for Extrusion Coating—High Pressure Copolymers, 1995 Polymers, Laminations & Coating Conference, pp. 613-623.
Hjertberg et al, The Effect of Corona Discharge Treatment of Ethylene Copolymers on Their Adhesion to Aluminum, J. Appl. Polymer Science, vol. 37, 1183-1195 (1989).
PCT International Search Report for International application No. PCT/US2004/034347, dated Mar. 14, 2005.
Fella, Dan et al, Adhesion Properties and Performance of Ethylene-Ethylacrylate, TAPPI, Rome, May 2003.
Walther, Brian et al, Adhesion Properties and Performance of Ethylene-Ethylacrylate Copolymers, TAPPI, Rome, May 2003.

* cited by examiner

*Primary Examiner* — Rena Dye
*Assistant Examiner* — Erik Kashnikow
(74) *Attorney, Agent, or Firm* — Lucas K. Shay

(57) ABSTRACT

Disclosed is a multilayer structure, which comprises or is produced from a foil laminated to thermoplastic compositions using ethylene/butyl acrylate copolymer compositions as a tie layer. The multilayer structures can be useful as packaging films and industrial films. Also disclosed is a lamination process for producing the structure. Further disclosed are packages comprising the structures.

19 Claims, No Drawings

LAMINATION ADHESION OF FOIL TO THERMOPLASTIC POLYMERS

This application claims the priority of U.S. Provisional Application 60/512,545 filed Oct. 17, 2003, the entire disclosure of which is incorporated herein by reference.

FIELD OF THE INVENTION

This invention relates to adhesion of foil to thermoplastic compositions comprising ethylene/butyl acrylate copolymer, to multilayer structures comprising foil laminated to thermoplastic compositions, and to packages comprising these multilayer structures.

BACKGROUND OF THE INVENTION

Aluminum foil (Al) is used extensively in the food packaging industry as a moisture and gas barrier. Because of foil's poor flex crack resistance, inability to form a hermetic seal, and cost, it is typically combined with other materials such as paper, polyethylene (PE) and oriented polypropylene (OPP) in multilayer structures. Applications include many dry food packages such as powdered drink mix pouches as well as non-packaging applications. Some common multi-layer structures include Paper/LDPE/Al/LDPE and OPP/primer/LDPE/Al/LDPE in which LDPE is low-density polyethylene and the paper or OPP provide stiffness and a surface for printing. The primer allows LDPE to bond to the OPP substrate; the first LDPE layer provides adhesion to the aluminum foil and the second acts as a sealing layer.

These structures are typically made by extrusion coating or lamination, which involves laying down a molten curtain of the polymer between the substrates moving at high speeds as they come into contact with a cold roll. Adhesion of polyethylene to foil can be accomplished by processing at high coating temperatures (300 to 330° C.) so that a portion of the polyethylene oxidizes. Oxidization of the LDPE creates polar species that provide moderate adhesion to the aluminum foil.

In many applications, rather than using a coated layer of LDPE as the sealant, a LDPE or LLDPE (linear low-density polyethylene) film is used. For example: Paper/LDPE/Al/LDPE/PE-film. The PE-film may be LDPE or LLDPE, but is typically LLDPE-based. A PE film has a number of advantages over a LDPE coating: For example, the PE-film can be made thicker than a coating, allowing for caulking of the seal interface. LLDPE-films provide higher seal strength. Blown films have better strength and tear resistance. Blown films provide greater stiffness. Blown films, processed at much lower temperatures than extrusion coating, have less taste and odor problems (associated with the oxidation of the LDPE).

LDPE is the predominant resin currently used for extrusion lamination. However, a substantial problem with using LDPE to extrusion laminate PE-films to aluminum foil is that the adhesion of the LDPE to aluminum foil "ages down" with time. Adhesion of LDPE to aluminum foil is only marginal to begin with, but over a time period of one to several weeks, the bond strength often declines to a level that is no longer functional for the application. One explanation is that the aging may be associated with secondary crystallinity of the LDPE. During the lamination process, the LDPE is quenched very quickly and little primary crystallization can occur. Over time, small "secondary" crystals may form. As PE crystallizes, it shrinks. Shrinkage can put a stress on bonds and reduce peel strength. The LDPE-Al bond is the weakest of the bonds in the structure (bonds of the LDPE to the PE-film are typically inseparable), and so its peel strength is reduced.

In adhering foil to non-polar polymer compositions, use of an additional polymeric composition as an adhesive or "tie" layer can be beneficial. Often, more polar polymeric materials adhere to foil more readily than less polar materials. However, polar polymers that adhere well to foil may not adhere well to non-polar polymers. Therefore, a tie layer preferably provides a balance of properties that allow it to adhere both to foil and to non-polar polymers.

Chemical primers are sometimes used to promote adhesion to non-polar substrates, but this adds costs and causes environmental concerns with solvent-based systems. Thus, it is desirable to adhere foil to non-polar polymer compositions without the use of primers.

SUMMARY OF THE INVENTION

The invention comprises a composition that can comprise or be produced from a multilayer structure. The structure can comprise or be produced from at least one layer of foil; at least one layer of an ethylene/butyl acrylate copolymer composition; at least one layer of a thermoplastic polyolefin composition; and optionally additional layer comprising paper, polyester, polyamide, ethylene vinyl alcohol, polyethylene vinyl acetate, ethylene/acrylic acid copolymer or an ionomer thereof, polyvinylidene chloride, anhydride-modified ethylene homo- and co-polymer, or combinations of two or more thereof.

The invention also comprises a process that can enhance adhesion of foil to thermoplastic compositions. The process can comprise combining, such as extruding, an ethylene/butyl acrylate copolymer composition between a layer of foil and a layer of a thermoplastic polyolefin composition.

The invention also comprises packages comprising the multilayer structure.

DETAILED DESCRIPTION OF THE INVENTION

All references disclosed herein are incorporated by reference.

Thermoplastic compositions are polymeric materials that can flow when heated under pressure. Melt index (MI) is the mass rate of flow of a polymer through a specified capillary under controlled conditions of temperature and pressure. Melt indices reported herein are determined according to ASTM 1238 at 190° C. using a 2160 g weight, with values of MI reported in grams/10 minutes. The thermoplastic compositions described herein are suitable for preparation of films and multilayer structures by extrusion processing.

The term "foil" as used herein refers to a thin, flexible film or sheet of metal, particularly aluminum. It also refers to multilayer structures in which at least one layer of aluminum is adhered to additional layers of other materials, provided at least one face of the multilayer structure is a layer of aluminum.

The term "ethylene/butyl acrylate copolymers" includes copolymers of ethylene and butyl acrylates wherein the alkyl moiety contains four carbon atoms. "Ethylene/butyl acrylate (abbreviated EBA)" means a copolymer of ethylene (abbreviated E) and butyl acrylate (abbreviated BA). Of note are ethylene/butyl acrylate copolymers prepared from n-butyl acrylate comonomers (EnBA). Of note are ethylene/butyl acrylate copolymers prepared from i-butyl acrylate comonomers (EiBA). Preferred are EnBA copolymers.

The relative amount of the butyl acrylate comonomer incorporated into ethylene/butyl acrylate copolymer can, in principle, vary broadly from a few weight percent up to as high as 40 weight percent of the total copolymer or even higher. The relative amount of the butyl acrylate group present in the ethylene/butyl acrylate copolymer can be viewed as establishing how and to what degree the resulting ethylene copolymer is to be viewed as a polar polymeric composition.

Preferably, the butyl acrylate comonomer has a concentration range of from 5 to 30 weight %, alternatively from 7 to 27 weight %, of the ethylene/butyl acrylate copolymer, more preferably from 15 to 30 weight %, alternatively from 17 to 27 weight %.

Ethylene/butyl acrylate copolymers can be prepared by processes well known in the polymer art using either autoclave or tubular reactors. The copolymerization can be run as a continuous process in an autoclave: ethylene, butyl acrylate, and optionally a solvent such as methanol (see U.S. Pat. No. 5,028,674) are fed continuously into a stirred autoclave of the type disclosed in U.S. Pat. No. 2,897,183, together with an initiator. The rate of addition can depend on variables such as the polymerization temperature, pressure, and concentration of the butyl acrylate monomer in the reaction mixture needed to achieve the target composition of the copolymer. In some cases, it may be desirable to use a telogen such as propane, to control the molecular weight. The reaction mixture is continuously removed from the autoclave. After the reaction mixture leaves the reaction vessel, the copolymer is separated from the unreacted monomers and solvent (if solvent was used) by conventional means, e.g., vaporizing the nonpolymerized materials and solvent under reduced pressure and at an elevated temperature.

Tubular reactor produced ethylene/butyl acrylate copolymer can be distinguished from the more conventional autoclave produced ethylene/butyl acrylate as generally known in the art. Thus the term or phrase "tubular reactor produced" ethylene/butyl acrylate copolymer, for purposes of this invention, denotes an ethylene copolymer produced at high pressure and elevated temperature in a tubular reactor or the like, wherein the inherent consequences of dissimilar reaction kinetics for the respective ethylene and butyl acrylate comonomers is alleviated or partially compensated by the intentional introduction of the monomers along the reaction flow path within the tubular reactor. As generally recognized in the art, such a tubular reactor copolymerization technique can produce a copolymer having a greater relative degree of heterogeneity along the polymer backbone (a more blocky distribution of comonomers), tend to reduce the presence of long chain branching and will produce a copolymer characterized by a higher melting point than one produced at the same comonomer ratio in a high pressure stirred autoclave reactor. Tubular reactor produced ethylene/butyl acrylate copolymers are generally stiffer and more elastic than autoclave produced ethylene/butyl acrylate copolymers.

Tubular reactor produced ethylene/butyl acrylate copolymers of this nature are commercially available from E.I. du Pont de Nemours and Company (DuPont), Wilmington, Del. The actual manufacturing of the tubular reactor ethylene/butyl acrylate copolymers as previously stated is preferably in a high pressure, tubular reactor at elevated temperature with additional introduction of reactant comonomer along the tube and not merely manufactured in a stirred high-temperature and high-pressure autoclave type reactor. However, similar ethylene/butyl acrylate copolymeric material can be produced in a series of autoclave reactors wherein comonomer replacement is achieved by multiple zone introduction of reactant comonomer as disclosed in U.S. Pat. Nos. 3,350,372; 3,756,996; and 5,532,066, and as such these high melting point materials can be considered equivalent.

For additional general discussion regarding the differences between tubular reactor produced and autoclave produced ethylene/alkyl acrylate copolymers, see Richard T. Chou, Mimi Y. Keating and Lester J. Hughes, "High Flexibility EMA made from High Pressure Tubular Process", Annual Technical Conference—Society of Plastics Engineers (2002), 60th (Vol. 2), 1832-1836. CODEN: ACPED4 ISSN: 0272-5223; AN 2002:572809.

Ethylene/butyl acrylate copolymers suitable for use in this invention are available from DuPont. See Table A for specific examples of ethylene/butyl acrylate copolymers available from DuPont.

TABLE A

| Copolymer | Butyl acrylate weight % | Melt Index (g/10 min) |
| --- | --- | --- |
| EBA-1 | 7 | 1.1 |
| EBA-2 | 7 | 1.1 |
| EBA-3 | 17 | 1.5 |
| EBA-4 | 17 | 1.8 |
| EBA-5 | 27 | 4.3 |
| EBA-6 | 17 | 7.4 |

The ethylene/butyl acrylate copolymers available for use in the invention can vary in molecular weight, as shown by the range of melt index in Table A. The specific selection of the melt index (MI) grade of polymer component(s) can be influenced by balancing the processibility of the EBA in extrusion lamination with the needs for adhesion between the foil and the thermoplastic composition. Preferred are ethylene/butyl acrylate copolymers having MI's from about 4 to about 12 g/10 min. Of note are EBA-5 and EBA-6, having MI's of 4.3 and 7.4 g/10 min, respectively.

The EBA compositions useful in this invention may optionally further comprise additives such as thermal and ultraviolet (UV) stabilizers, UV absorbers, antistatic agents, processing aids, fluorescent whitening agents, pigments, lubricants, etc. These conventional ingredients may be present in the compositions used in this invention in quantities that are generally from 0.01 to 20 weight %, preferably from 0.1 to 15 weight %, so long as they do not detract from the adhesion functionality of the polymer.

The EBA compositions useful in this invention may optionally further comprise from about 1 to about 30 weight %, preferably from 5 to 25 weight %, more preferably 10 to 20 weight % of a polyolefin, such as polyethylene or polypropylene. The polyolefin may be added to the EBA compositions to improve compatibility with the polyolefin substrate.

The optional incorporation of such conventional ingredients into the compositions can be carried out by any known process. This incorporation can be carried out, for example, by dry blending, by extruding a mixture of the various constituents, by conventional masterbatch technique, or the like. The optional polyolefin may also be incorporated as part of a recycle process.

Polyolefins suitable for use in the present invention can be polypropylene or polyethylene polymers and copolymers comprising ethylene or propylene. Polyethylenes (PE) and polypropylene (PP) can be prepared by any means known to one skilled in the art including well-known Ziegler-Natta catalyst polymerization (e.g., U.S. Pat. No. 4,076,698 and U.S. Pat. No. 3,645,992), metallocene catalyst polymerization (e.g., U.S. Pat. No. 5,198,401 and U.S. Pat. No. 5,405,922), and by free radical polymerization. Because the means are well known to one skilled in the art, the description of which is omitted for the interest of brevity. PE polymers can include linear or branched polyethylenes such as high density polyethylene (HDPE), LLDPE, very low or ultra low density polyethylenes (VLDPE or ULDPE), and LDPE. The densities of polyethylenes suitable for use in the invention include all known PE and can range from 0.865 g/cc to 0.970 g/cc. Linear polyethylenes for use herein can incorporate alpha-olefin comonomers such as butene, hexene or octene to decrease their density within the density range so described. The term "polyethylene" when used herein is used generically to refer to any or all of the polymers comprising ethylene described above.

PP polymers can include homopolymers, random copolymers, block copolymers and terpolymers of propylene. Copolymers of propylene include copolymers of propylene with other olefins such as ethylene, 1-butene, 2-butene and the various pentene isomers, etc. and preferably copolymers of propylene with ethylene. Terpolymers of propylene include copolymers of propylene with ethylene and one other olefin. Random copolymers, also known as statistical copolymers, are polymers in which the propylene and the comonomer(s) are randomly distributed throughout the polymeric chain in ratios corresponding to the feed ratio of the propylene to the comonomer(s). Block copolymers are made up of chain segments consisting of propylene homopolymer and of chain segments consisting of, for example, random copolymer of propylene and ethylene. The term "polypropylene" when used herein is used generically to refer to any or all of the polymers comprising propylene described above. Additional information relating to block copolymers and to their manufacture may be found particularly in chapters 4.4 and 4.7 of the work "Block Copolymers" edited by D. C. Allport and W. H. Janes, published by Applied Science Publishers Ltd in 1973, which are incorporated by reference in the present description.

The multilayer structure can be produced by a process including extrusion coating or lamination, involves laying down a molten curtain of the ethylene/butyl acrylate copolymer composition between the foil and polyolefin film substrates moving at high speeds (e.g., from about 100 to 1000 feet per minute and preferably from about 300 to 800 feet per minute) as they come into contact with a cold roll. The melt curtain can be formed by extruding the ethylene/butyl copolymer composition through a flat die. The temperature of the ethylene/butyl copolymer composition as it leaves the die is preferably about 300 to 340° C. and most preferably about 310 to 330° C. The air gap between the die exit and cold roll is typically about 3 to 15 inches, preferably from about 5 to about 10 inches. Higher temperatures generally give higher adhesion values, subject to the limitations of the thermal stability of the polymer. Lower line speeds and higher air gaps also favor adhesion. Typically, the time in the air gap (TIAG) defined as the air gap divided by the line speed should be between about 50 and 100 ms for optimal adhesion in extrusion lamination. See V. Antonov and A. Soutar, 1991 TAPPI PLC Conference Proceedings, page 553. The laminate is cooled on a cold roll and hauled off at a line speed of between about 100 and 1000 feet/minute, preferably between about 300 and 800 feet/minute.

Films useful in lamination processes can be made by virtually any method known to those skilled in this art. The film can be either a single layer or multilayer polymeric film. As such, the film and film structures can be typically cast, extruded, co-extruded, laminated and the like, including orientation (either uniaxially or biaxially) by various methodologies (e.g., blown film, mechanical stretching or the like). Various additives can be present in the respective film layers including the presence of tie layers and the like. The additives can be one or more antioxidants, thermal stabilizers, ultraviolet (UV) light stabilizers, pigments and dyes, fillers, delustrants, anti-slip agents, plasticizers, anti-block agents, other processing aids, and the like.

The film can be produced according to any known methods. For example, a primary film can be produced by extruding the compositions using so-called "blown film" or "flat die" methods, which are well known to one skilled in the art. A blown film can be prepared by extruding the polymeric composition through an annular die and expanding the resulting tubular film with an air current to provide a blown film. Cast flat films can be prepared by extruding the composition through a flat die. The film leaving the die is cooled by at least one roll containing internally circulating fluid (a chill roll) or by a water bath to provide a cast film.

A film can be further oriented beyond the immediate quenching or casting of the film. The process comprises the steps of extruding a laminar flow of molten polymer, quenching the extrudate and orienting the quenched extrudate in at least one direction. "Quenched" describes an extrudate that has been substantially cooled below its melting point to obtain a solid film material.

The film can be unoriented, oriented in a uniaxial direction (e.g. machine direction), or oriented in a biaxial direction (e.g. machine direction and transverse direction). The film is preferably biaxially oriented by drawing in two mutually perpendicular directions in the plane of the film for a satisfactory combination of mechanical and physical properties.

Orientation and stretching apparatus to uniaxially or biaxially stretch film are known in the art and may be adapted by those skilled in the art to produce films of the present invention. Examples of such apparatus and processes include, for example, those disclosed in U.S. Pat. Nos. 3,278,663; 3,337,665; 3,456,044; 4,590,106; 4,760,116; 4,769,421; 4,797,235 and 4,886,634.

A blown film may be oriented using a double bubble extrusion process, where simultaneous biaxial orientation may be effected by extruding a primary tube which is subsequently quenched, reheated and then expanded by internal gas pressure to induce transverse orientation, and drawn by differential speed nip or conveying rollers at a rate which will induce longitudinal orientation.

The processing to obtain an oriented blown film is known in the art as a double bubble technique, and can be carried out as disclosed in U.S. Pat. No. 3,456,044. A primary tube can be melt extruded from an annular die. This extruded primary tube can be cooled quickly to minimize crystallization. It is then heated to its orientation temperature (for example, by means of a water bath). In the orientation zone of the film fabrication unit a secondary tube is formed by inflation, thereby the film is radially expanded in the transverse direction and pulled or stretched in the machine direction at a temperature such that expansion occurs in both directions, preferably simultaneously; the expansion of the tubing being accompanied by a sharp, sudden reduction of thickness at the draw point. The tubular film is then again flattened through nip rolls. The film can be reinflated and passed through an annealing step (thermofixation), during which step it is heated once more to adjust the shrink properties.

In one embodiment, the film is formed by an extrusion process that causes the polymer chains in the film to be generally aligned in the direction of extrusion. Linear polymers, after being highly oriented uniaxially possess considerable strength in the orientation direction, but less strength in the transverse direction. This alignment can add strength to the film in the direction of extrusion.

The film used in this invention may be treated by means of corona discharge, ozone or other means standard in the industry, although treatment is not required for good adhesion to the EBA adhesive layer. The film is laminated to a substrate such as foil using an EBA composition as an adhesive layer to provide a multilayer structure of this invention. The adhesion of the multilayer structure is typically improved by increasing the thickness of the EBA layer. The thickness of the EBA layer is preferably between about 10 and 40 microns and most preferably between about 15 and 30 microns thick.

A multilayer structure comprising (a) at least one layer of foil; (b) at least one layer of an ethylene/butyl acrylate copolymer composition; (c) at least one layer of a thermoplastic polyolefin composition; and optionally (d) a material selected from the group consisting of paper, polyesters such as polyethylene terephthalate, polyamides, polyethylene vinyl alcohol, polyethylene vinyl acetate, ethylene/acrylic acid copolymers and ionomers thereof, polyvinylidene chloride and anhydride-modified ethylene homo- and co-polymers.

The multilayer structures can be prepared as described above in which a foil-containing substrate (prepared for example, by lamination or extrusion coating) is adhered to a film comprising a polyolefin using an EBA copolymer composition as an adhesive layer. The foil-containing substrate, the film comprising the polyolefin (or both) may be a multilayer structure.

Of note is a multilayer structure comprising a layer comprising oriented polyester (particularly polyethylene terephthalate), a layer comprising ethylene/acrylic acid copolymer, a layer comprising foil, a layer comprising an ethylene/butyl acrylate copolymer composition, and a layer comprising polyethylene. Also of note is a multilayer structure comprising: a layer comprising foil, a layer comprising an ethylene/butyl acrylate copolymer composition, and a layer comprising polypropylene.

The multilayer structures as disclosed herein are useful in packaging applications or as packaging materials. They may also be used as industrial films (for example, as a structural component in insulation sheeting).

The packaging materials may also be processed further by, for example but not limitation, printing, embossing, and/or coloring to provide a packaging material to provide information to the consumer about the product therein and/or to provide a pleasing appearance of the package.

The packaging materials may be formed into packages, such as pouches, by standard methods well known in the art. Accordingly, this invention provides packages comprising multilayer structures as described above.

The following Examples are merely illustrative, and are not to be construed as limiting the scope of the invention described and/or claimed herein.

EXAMPLES

General Procedures Used to Prepare the Laminates

The laminates were prepared using an extrusion laminating process. Substrate A was combined with substrate C using an adhesive layer B.

Substrate A

In Examples 1 through 8, substrate A was a laminate of oriented polyester (OPET) and aluminum foil: 13-microns OPET/19-microns ethylene/acrylic acid (E/AA) copolymer with 7 weight % AA/9-microns aluminum foil. The OPET was Melinex® 7100 supplied by DuPont Teijin Films. The (E/AA) copolymer was Nucrel® 30707, an ethylene acrylic acid copolymer with 7% AA manufactured by DuPont. Substrate A was prepared by extruding the E/AA copolymer using a 4.5-inch diameter, 126-inch long, single screw extruder (with an exit temperature of 321° C.) through an ER-WE-PA feedblock with a 40-inch wide (internally deckled to 29 inches) Cloeren edge bead reduction die having a 30-mil gap operated at 321° C. and backpressure 500 psig to form a 19-micron-thick layer laid down between the foil and OPET layers. The die plug and blade settings were 2.25 and 1.5 inches, respectively. The air gap between the die exit and the nip (where the extrudate contacts the foil and OPET film) was 8 inches. The assembly was then passed over a chill roll that was operated at 10° C. The line speed was 500 feet per minute.

Adhesive Layer B

The resins used for the lamination adhesive layer B in the Examples described below are listed in Table 1, wherein MA stands for methyl acrylate, EA stands for ethyl acrylate, BA stands for butyl acrylate and AA stands for acrylic acid. Resins e and f were EBA resins that were used in lamination processes in accordance with this invention to prepare multilayer structures of this invention. Resin a was a polyethylene composition that can be blended with an EBA resin to form an EBA/PE composition used in accordance with this invention (or used as an adhesive composition in Comparative Examples). The other resins listed in Table 1 were used for preparation of Comparative Examples.

TABLE 1

| Resin | MI (g/ 10 min) | Co-monomer | Wt. % | Mole % | Autoclave (A) or Tubular (T) | Comment |
|---|---|---|---|---|---|---|
| a | 7 | None | 0 | 0 | A | 0.918 g/cc, LDPE |
| b | 9 | MA | 13 | 4.6 | T | |
| c | 6 | MA | 9 | 3.1 | T | |
| d | 6 | EA | 13 | 4.7 | T | |
| e | 7 | BA | 17 | 4.3 | T | EBA-5 |
| f | 4 | BA | 27 | 7.4 | T | EBA-6 |
| g | 6 | MA | 20 | 8.3 | A | |
| h | 7 | AA | 7 | 2.8 | A | |
| i | 11 | AA | 3 | 1.2 | A | |

Substrate C

Substrate C was a 50μ thick polyethylene blown film made of 80% of a butene LLDPE (Sclair 11E1 manufactured by Nova) and 20% high pressure LDPE (Novapol LF-0219A manufactured by Nova). The film was prepared on a Welex blown film line with an 8-inch diameter Victor die. The take-off speed was 38 feet per minute, the frost line height was 26 inches, the blow-up ratio was 2.7 and the layflat was 34 inches. Die gap was 15 thousandths of an inch. Processing temperature was 210° C.

The laminate A/B/C was prepared by extruding the adhesive polymer using a 4.5-inch diameter, 126-inch long, single-screw extruder. The extrudate from the extruder flowed through an ER-WE-PA feedblock with a 40-inch wide (internally deckled to 29 inches) Cloeren edge bead reduction die having a 30-mil gap, blade set at 1.5 inches and plug set at 2.25 inches. The adhesive layer B was laid down between substrates A and C such that it contacted the foil layer of Substrate A.

Tests Employed in Examples

Peel Strength: One-inch wide strips were cut in the machine direction from near the center of the laminate. The layers were separated at the A-B interface unless otherwise noted and pulled in a tensile tester at room temperature in a "T-peel" configuration at a separation speed of 12 inches/min. The average force required to separate the layers divided by the width was reported as the peel strength. Five separate determinations were averaged together for a given mean value (values in tables were rounded to the nearest 10, with values ending in 5 rounded up). Also reported was the standard deviation (Std). See ASTM F904. Green peel strength was measured within four hours of producing the structure. Peel strength on the same sample was typically measured again after being stored in a 50% relative humidity, 23° C. controlled environment for one, four and six weeks.

The mode of failure reported in Tables 2 through 5 was characterized by the following descriptors:
P=peels cleanly away from the substrate,
LS=B/C film layers split,
E=elongation of the peel arm as it was pulled away from the substrate,
D=C layer peels from the B layer while B stays with layer A, and
FT=foil tear.

Examples 1

C1 to C3

The laminate A/B/C was prepared using an extruder exit temperature of 321° C., air gap of 8 inches, line speed of 500 feet/minute, chill roll temperature of 10° C., lead-in of −0.6 inches, and nip pressure of 60 psig. The nip to chill roll contact across the 740 mm width was from about 13 to about 15 mm. The thickness of layer B was from about 0.6 to about 0.8 mils.

TABLE 2

| | | Peel Strength to Foil, g/in | | | | | | | | | | | |
|---|---|---|---|---|---|---|---|---|---|---|---|---|---|
| | | Green | | | 1 week | | | 4 weeks | | | 6 weeks | | |
| Ex. | Layer B | Mean | Std | Mode | Mean | Std | Mode | Mean | Std | Mode | Mean | Std | Mode |
| 1 | f | 1240 | 120 | E/P | 1390 | 50 | E/P | 1470 | 40 | E/P | 1530 | 20 | E/P |
| C1 | a | 310 | 20 | P | 220 | 10 | P | 240 | 10 | P | 240 | 10 | P |
| C2 | h | 720 | 120 | P | 660 | 200 | P | 750 | 230 | P | 590 | 110 | P |
| C3 | i | 1070 | 380 | LS, P, D | 630 | 220 | P, P/D | 1060 | 340 | P, EP, PD | 910 | 520 | P, E/LS, P, E/P |

Examples 2 to 4

C4 to C9

The laminate A/B/C was prepared using an extruder exit temperature of 321° C., air gap of 8 inches, line speed of 500 feet/minute, chill roll temperature of 10° C., lead-in of −0.5 inches, and nip pressure of 60 psig. The nip to chill roll contact across the 740 mm width was from about 13 to about 15 mm. The thickness of layer B was from about 0.6 to about 0.8 mils.

TABLE 3

| | | Peel Strength to Foil, g/in | | | | | | | | | | | |
|---|---|---|---|---|---|---|---|---|---|---|---|---|---|
| | | Green | | | 1 week | | | 4 weeks | | | 6 weeks | | |
| Ex | Layer B | Mean | Std | Mode | Mean | Std | Mode | Mean | Std | Mode | Mean | Std | Mode |
| 2 | f | 1120 | 120 | P, P/LS | 1260 | 140 | E/P | 1460 | 130 | E/P | 1410 | 40 | P/D, LS |
| 3 | e | 1140 | 160 | P, P/LS | 1250 | 190 | E/P, E/P/D | 1300 | 230 | P, E/P, P/D | 1350 | 40 | LS, E/P/D |
| 4 | 80% f, 20% a | 1190 | 160 | P | 1180 | 160 | P | 1330 | 160 | P, E/P | 1460 | 40 | LS |
| C4 | a | 260 | 10 | P | 230 | 10 | P | 230 | 10 | P | 230 | 10 | P |
| C5 | h* | 740 | 160 | P/LS | 370 | 10 | P | 310 | 60 | + | 130 | 10 | + |
| C6 | g | 640 | 30 | P | 590 | 30 | P | 610 | 10 | P | 710 | 160 | E/P |
| C7 | b | 760 | 90 | P, D, LS | 730 | 120 | P/D, LS | 830 | 140 | P/D, LS | 1160 | 220 | D, E/P |
| C8 | c | 530 | 50 | P | 510 | 40 | P | 510 | 40 | P | 690 | 200 | P |
| C9 | d | 930 | 130 | E/P, LS | 1020 | 200 | P/D, LS | 1240 | 350 | P, D, LS | 1030 | 150 | P, LS |

*282° C. exit extruder and die.
+ PE from tie

Examples 5 to 8

Effect of Extrusion Temperature

The laminate A/B/C was prepared using resin f for layer B, air gap of 8-inches, line speed of 500 feet/minute, chill roll temperature of 10° C., lead-in of −0.5 inches, and nip pressure of 60 psig. The nip to chill roll contact across the 740 mm width was from about 13 to about 15 mm. The thickness of layer B was from about 0.6 to about 0.8 mils. The extrusion temperature was varied from about 545 to about 326° C.

TABLE 4

| | Extrusion Temperature, | Peel Strength to Foil, g/in | | | | | | | | | | | |
|---|---|---|---|---|---|---|---|---|---|---|---|---|---|
| | | Green | | | 1 week | | | 4 weeks | | | 6 weeks | | |
| Ex. | ° C. | Mean | Std | Mode | Mean | Std | Mode | Mean | Std | Mode | Mean | Std | Mode |
| 5 | 285 | 800 | 170 | P, L S | 710 | 160 | P, L S | 510 | 210 | P, L S | 510 | 120 | P |
| 6 | 303 | 790 | 20 | P | 810 | 50 | P | 720 | 40 | P | 770 | 70 | P |
| 7 | 314 | 1120 | 150 | P | 1020 | 100 | E/P, P | 1180 | 210 | P, E/P | 1290 | 100 | P, E/P |
| 8 | 326 | 1170 | 180 | P | 1210 | 200 | E/P, P | 1560 | 310 | * | 1600 | 310 | E/P |

*E/P, LS, E/P/D

Examples 9 and 10

Laminations of Aluminum Foil and BOPP

In Examples 9 and 10, substrate A was 30-micron thick aluminum foil, adhesive polymer layer B was resin f and substrate C was a biaxially oriented polypropylene (BOPP, grade 17MB400 manufactured by ExxonMobil). Resin f was extruded in a 3.5-inch diameter extruder with a melt temperature of 330° C. It was fed through an Egan feed-block and T-slot die with external deckles. The die gap was 0.7 mm and the die width 720 mm. Chill roll temperature was 12° C., air gap 150 mm, line speed 100 meters/minute. The specific force applied in the nip was 5.4 N/m. The Corona treatment was set at a power of 4.5 kW.

TABLE 5

| Ex. | Substrate A | Layer B Resin | Substrate C | Green PS, g/in To Foil | Green PS, g/in To BOPP |
|---|---|---|---|---|---|
| 9 | Al foil | f | Corona-BOPP | 510-760 | 510-760 |
| 10 | Al foil | f | BOPP | 760 | 760 |

Inspection of the peel strength data in Tables 1 through 5 showed that use of ethylene/butyl acrylate copolymers as adhesive layers in lamination of foil to polyolefins provided significantly better adhesion and that this adhesion was maintained over time.

Example 11

Substrate A was the same OPET/Nucrel/foil laminate disclosed in examples 1-8. Adhesive layer B was "f" from Table 1. Substrate C was 0.7-mil OPP film from Toray Plastics (grade Y117), Japan. Laminate A/B/C was prepared as disclosed for Examples 1-8. Specific processing conditions were 324° C. coating temperature, 400 feet/minute line speed, 6-inch air gap, 10° C. chill roll temperature, 60 psig nip pressure, and −0.5-inch lead-in.

Peel strength measurements were attempted green at 1 week and 4 weeks. The peel to the foil or to the OPP could not be started indicating that the adhesive strength exceeded the tear strength of the OPP.

Examples 12 and 13

Substrate A was 2-mil aluminum foil. Substrate B was "f" from Table 1. Substrate C was a 0.6-mil OPP film from Applied Extrusion Technologies (grade B602) that was corona treated on one side and untreated on the other. Laminate A/B/C was prepared as described for Examples 1-8. Specific processing conditions were 321° C. coating temperature, 500 feet/minute line speed, 8-inch air gap, 10° C. chill roll temperature, 60 psig nip pressure, and −0.5-inch lead-in. The results are shown in Table 6 where the secondary substrate in Example 12 was treated OPP and for Example 13 was untreated OPP.

TABLE 6

| | Peel Strength to Foil, g/in | | | | | | | | |
|---|---|---|---|---|---|---|---|---|---|
| | Green | | | 1 week | | | 4 weeks | | |
| Example | Mean | Standard | Mode | Mean | Standard | Mode | Mean | Standard | Mode |
| 12 | 1210 | 100 | p | 1500 | 120 | Peel | 1610 | 120 | P/D/T |
| 13 | 1120 | 95 | L, S, P | 1430 | 90 | P, P/T | 1530 | 225 | P/D/T |

Attempt to measure the peel strength between Layer B and Layer C (tie layer and OPP) failed to get the peel started. It indicates that the adhesive strength exceeded the tear strength of the OPP.

What is claimed is:

1. A multilayer structure comprising or produced from at least one layer comprising foil; at least one layer of an ethylene/butyl acrylate copolymer composition; at least one layer of a thermoplastic polyolefin composition; and optionally at least one additional layer comprising or produced from paper, polyester, polyamide, ethylene vinyl alcohol, polyethylene vinyl acetate, ethylene/acrylic acid copolymer or an ionomer thereof, polyvinylidene chloride, anhydride-modified ethylene polymer, or combinations of two or more thereof wherein the foil is a metal foil and the layer of the ethylene/butyl acrylate copolymer composition is laminated to and in contact with both the layer comprising foil and the layer of the thermoplastic polyolefin composition.

2. The multilayer structure of claim 1 wherein said foil is aluminum foil.

3. The multilayer structure of claim 1 wherein said ethylene/butyl acrylate copolymer composition comprises from about 1 to about 30 weight % of a polyolefin.

4. The multilayer structure of claim 2 wherein said ethylene/butyl acrylate copolymer composition comprises from about 10 to about 20 weight % of a polyolefin.

5. The multilayer structure of claim 3 wherein said polyolefin is polyethylene, polypropylene, or both.

6. The multilayer structure of claim 4 wherein said polyolefin is polyethylene, polypropylene, or both.

7. The multilayer structure of claim 1 further comprising the at least one additional layer.

8. The multilayer structure of claim 2 further comprising the at least one additional layer.

9. The multilayer structure of claim 3 further comprising the at least one additional layer.

10. The multilayer structure of claim 4 further comprising the at least one additional layer.

11. The multilayer structure of claim 5 further comprising the at least one additional layer.

12. The multilayer structure of claim 6 further comprising the at least one additional layer.

13. The multilayer structure of claim 1, 2, 3, 4, 9, 10, 11, or 12 wherein the ethylene/butyl acrylate copolymer is prepared in a tubular reactor and the multilayer structure is co-extruded multilayer structure.

14. A package comprising a multilayer structure as recited in claim 1, 2, 3, 4, 9, 10, 11, or 12.

15. A package comprising a multilayer structure as recited in claim 13.

16. The package of claim 14 that is formed into a pouch.

17. The package of claim 15 that is formed into a pouch.

18. A process comprising extruding an ethylene/butyl acrylate copolymer composition between a layer of foil and a layer of a thermoplastic polyolefin composition whereby a multilayer structure as recited in claim 1, 2, 3, 4, 9, 10, 11, or 12 is produced.

19. A process comprising extruding an ethylene/butyl acrylate copolymer composition between a layer of foil and a layer of a thermoplastic polyolefin composition whereby a multilayer structure as recited in claim 13 is produced.

* * * * *